United States Patent [19]

Citta et al.

[11] Patent Number: 5,181,112
[45] Date of Patent: Jan. 19, 1993

[54] TELEVISION SIGNAL TRANSMISSION SYSTEM WITH CARRIER OFFSET COMPENSATION

[75] Inventors: Richard W. Citta, Oak Park; Scott F. Halozan, Des Plaines; Gary J. Sgrignoli, Mt. Prospect, all of Ill.

[73] Assignee: Zenith Electronics Corporation

[21] Appl. No.: 667,153

[22] Filed: Mar. 11, 1991

[51] Int. Cl.$^5$ .................. H04N 7/04; H04N 7/00; H04N 11/04
[52] U.S. Cl. ..................... 358/141; 358/13; 358/133; 375/18
[58] Field of Search ............ 358/141, 13, 12, 133, 358/167, 135, 136, 158; 375/25, 34, 18, 26

[56] References Cited

U.S. PATENT DOCUMENTS

| | | | |
|---|---|---|---|
| 3,624,282 | 11/1971 | Salaman et al. | 375/43 |
| 3,792,356 | 2/1974 | Kobayashi et al. | 375/14 |
| 4,011,405 | 3/1977 | Ridout et al. | 375/18 |
| 4,251,886 | 2/1981 | Roza | 375/18 |
| 4,367,495 | 1/1983 | Mita et al. | 375/18 |
| 4,860,317 | 8/1989 | Tomilson | 358/133 |
| 4,875,095 | 10/1989 | Matsumoto et al. | 358/133 |
| 4,918,515 | 4/1990 | Faroudja | 358/141 |
| 5,040,063 | 8/1991 | Citta et al. | 358/141 |
| 5,040,191 | 8/1991 | Forney, Jr. et al. | 375/18 |
| 5,086,340 | 2/1992 | Citta et al. | 358/141 |
| 5,087,975 | 2/1992 | Citta et al. | 358/183 |
| 5,121,203 | 6/1992 | Citta | 358/141 |

*Primary Examiner*—James J. Groody
*Assistant Examiner*—S. Metjahic

[57] ABSTRACT

A television signal transmission system is used for transmitting an N-level video related data signal. The data signal is processed prior to transmission such that the majority of N-level symbols comprise a non-negative level for facilitating receiver lock-up. An in-phase pilot component may be added to the transmission by D.C. offsetting the processed signal to further facilitate receiver lock-up. The processed signal is precoded by a modulo-N filter and postcoded by a complementary linear filter in the receiver to reduce interfering NTSC components. In the absence of interfering NTSC components, a complementary modulo-N postcoding filter may be used in the receiver to provide improved signal to noise performance.

53 Claims, 6 Drawing Sheets

| LEVEL IN | LEVEL OUT |
|---|---|
| 3 | +3 |
| 2 | +1 |
| 1 | -1 |
| 0 | -3 |

| LEVEL IN | LEVEL OUT |
|---|---|
| 6 | 3 |
| 4 | 2 |
| 2 | 1 |
| 0 | 0 |
| -2 | 3 |
| -4 | 2 |
| -6 | 1 |

TELEVISION SIGNAL TRANSMISSION SYSTEM WITH CARRIER OFFSET COMPENSATION

CROSS-REFERENCE TO RELATED APPLICATIONS

The present application is related to the following copending U.S. applications, all assigned to Zenith Electronics Corporation: (1) Co-Channel Interference Reduction System for Digital High Definition Television, Ser. No. 601,169, filed Oct. 19, 1990, now U.S. Pat. No. 5,086,340 in the names of Richard W. Citta and Carl G. Eilers, (2) Co-Channel Interference Filter for Digital High Definition Television Receiver, Ser. No. 600,469, filed Oct. 19, 1990, in the name of Richard W. Citta, (3) HDTV Transmission System With Reduced NTSC Co-Channel Interference, Ser. No. 600,458, now U.S. Pat. No. 5,121,203 filed Oct. 19, 1990, and (4) VSB HDTV Transmission System With Reduced Co-Channel Interference, Ser. No. 611,236, filed Nov. 9, 1990, now U.S. Pat. No. 5,087,975 in the names of Richard W. Citta, Dennis M. Mutzabaugh and Gary J. Sgrignoli.

BACKGROUND OF THE INVENTION

The present invention relates generally to television signal transmission systems and particularly concerns digital television signal transmission systems employing fully or partially suppressed carriers.

U.S. patent application, Ser. No. 07/611,236, filed Nov. 9, 1990, now U.S. Pat. No. 5,087,975 discloses a television signal transmission system for transmitting and receiving a digital HDTV video signal over a standard 6 MH$_2$ television channel without excessive interference from an NTSC co-channel signal. The video signal is processed in the transmitter using a modulo-N precoding filter to facilitate the use of a complementary postcoding linear filter in the receiver to substantially cancel interfering NTSC co-channel beats without significantly affecting the received HDTV signal. Alternatively, in the absence of NTSC co-channel interference, the received signal may be processed by a complementary modulo-N postcoding filter which has better signal-to-noise performance than the linear postcoding filter.

In order to minimize the possibility of the HDTV transmission from interfering into an NTSC co-channel, it is desireable to transmit the HDTV signal using a suppressed carrier format or, alternatively, in conjunction with a relatively small pilot component. In either event, accommodations must be made to allow for proper reception of the transmitted signal. In particular, satisfactory receiver lock-up may be substantially enhanced by insuring that the average carrier level of the transmitted signal is characterized by at least a selected predetermined value. The digital video data itself is characterized by generally randomly occurring levels both above and below the zero carrier level and thus would normally provide a substantially zero average carrier level at the receiver. The system of the application referred to above included a quadrature pilot component at the carrier frequency to overcome this deficiency. However, for various reasons, it may be desirable to instead use an in-phase pilot component or, for that matter, no pilot component at all. In either of these cases, receiver lock-up may become a problem; in the former case because digital video data below the zero carrier level may cancel the pilot and in the latter case because of the randomly occurring nature of the digital video data above and below the zero carrier level.

It is therefore a basic object of the present invention to provide an improved digital television signal transmission system.

It is a more specific object of the invention to provide a digital television signal transmission system employing a relatively small in-phase pilot component or no pilot component at all.

It is another object of the invention to provide a digital television signal transmission system employing a relatively small in-phase pilot component or no pilot component at all and in which a digital video signal is coded in the transmitter by a modulo-N precoding filter and the received signal is processed by either a complementary linear postcoding filter or by a complementary modulo-N postcoding filter.

It is yet a further object of the invention to provide a television signal transmission system of the foregoing type wherein receiver performance is not substantially degraded by transmission errors.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

The principles of the invention will initially be explained in connection with the numerical examples set forth in FIGS. 1A-1M and the related simplified circuits and tables shown in FIGS. 2-6. Thereafter, specific embodiments illustrating the application of these principles to a television signal transmission system will be provided.

Figure 1A:
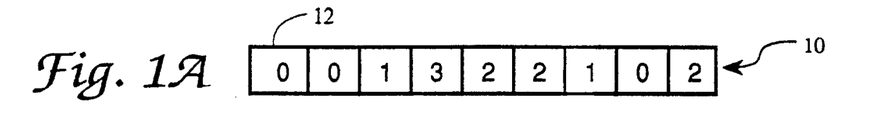
FIGS. 1A-1M present a numerical example illustrating the principles of the invention.

Referring, therefore, now to the drawings, an exemplary video related digital data segment 10 is illustrated in FIG. 1A. The data segment 10 comprises nine symbols, each of which may assume any one of the four levels 3-2-1-0. The last eight symbols of data segment 10 represent video related data generated by a suitable video processor, the first symbol 12 comprising a special offset symbol whose function will be described in further detail hereinafter. It will be understood that data segment 10 may comprise more or less symbols than that shown in the drawing and may represent any type of video signal such as a spatially and/or a temporally processed HDTV video signal. Also, it is within the scope of the invention to use symbols which may assume more or less than the four levels contemplated herein.

Figure 1B:
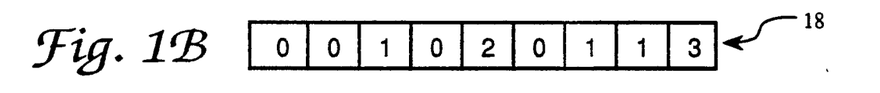
Figure 1C:
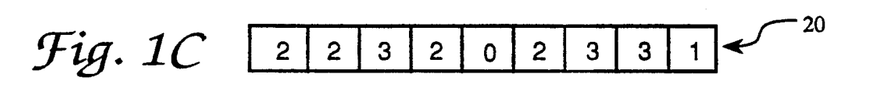
Figure 1D:
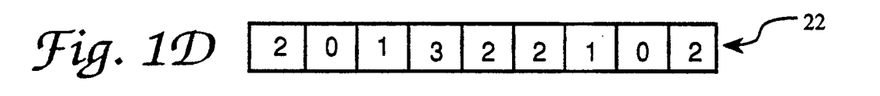

As explained in the referent copending applications, the video related data segment 10 is initially precoded by a modulo-N filter prior to transmission to facilitate the use of a complementary postcoding linear filter in a receiver for reducing any NTSC co-channel interference. A complementary modulo-N postcoding filter may alternatively be used to process the received signal in the absence of NTSC co-channel interference. An exemplary modulo-N precoding filter is shown in simplified block diagram form in FIG. 2 and will be seen to comprise a feedback filter including an input modulo-N adder 14 and a feedback delay element 16 having a delay corresponding to the temporal spacing of the data segment symbols. Application of data segment 10 to the precoding filter of FIG. 2 results in an output precoded data segment 18 as shown in FIG. 1B. In this regard, it will be understood that adder 14 employs modulo-4 addition in the derivation of precoded data segment 18.

As mentioned previously, the suppressed carrier transmission of a signal corresponding to precoded data segment 18, which is generally randomly occurring in nature, may result in substantial portions of the transmission being below the zero carrier level, even if an in-phase pilot component is utilized. This may increase the difficulty of proper receiver lock-up when traditional phase lock loop is employed. To overcome this deficiency, the invention provides a technique for delivering a signal to the receiver, the majority part of which comprises a predetermined positive or negative level of carrier signal. In particular, in a preferred embodiment of the invention the precoded data segment 18 is further processed prior to transmission such that the most often occurring symbol transmission level is caused to assume a selected value whereby a majority of the symbols of the data segment are arranged to assume a positive level. As will be seen hereinafter, the four data levels 3-2-1-0 characterizing precoded data segment 18 are translated to four respective corresponding levels such as 3-1-(-1)-(-3) or 4-2-0-(-2) prior to transmission. According to a preferred embodiment of the present invention, the selected value corresponds to the minimum positive level of either of the four latter levels, i.e., level 1 or level 2, which level corresponds to level 2 of precoded data segment 18. Use of the minimum positive transmission level as the selected value provides for improved receiver lock-up as described above (i.e. by forcing a majority of the symbols of the transmitted data segment to assume a non-negative level) while introducing less interference into a potential NTSC co-channel than if the maximum positive level was chosen as the selected level.

Figure 1E:
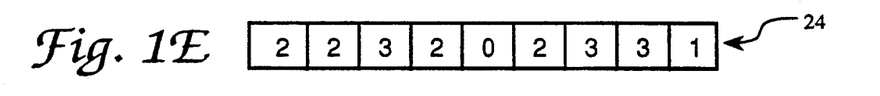

In accordance with the foregoing, the precoded data segment 18 is initially analyzed to determine the number of symbols characterized by each of the four levels 3-2-1-0. Referring to FIG. 1B, it will be seen that one (1) of the symbols is characterized by a 3-level, one (1) by a 2-level, three (3) by a 1-level and four (4) by a 0-level. The maximum or most often occurring level of the symbols of data segment 18 is therefore a 0-level, while the desired maximum occurring level (i.e., the selected level) is a 2-level. In accordance with one aspect of the invention, each symbol of precoded data segment 18, including offset symbol 12, is therefore offset in modulo-4 by a factor of 2 to derive the modified data segment 20 shown in FIG. 1C. Examination of data segment 20 reveals that the maximum occurring symbol level is a 2-level as desired. Alternatively, the same effect can be achieved by setting offset symbol 12 of data segment 10 to a 2-level to derive a data segment 22 (see FIG. 1D) and precoding the result using the filter of FIG. 2 to generate a modified data segment 24 as shown in FIG. 1E. In this regard, it will be observed that modified data segments 20 and 24 are identical since they were derived by respective operations that are mathematically equivalent.

Figure 1F:
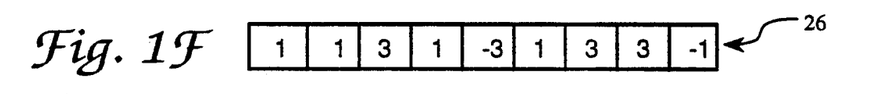
Figure 1G:
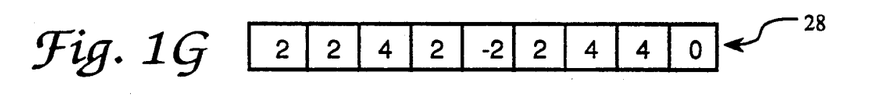
Figure 3:
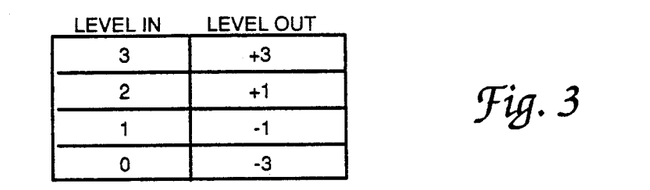
FIG. 3 is a level conversion table used in the encoder of the invention.

Modified data segment 20, 24 is next preferably mapped according to the mapping table of FIG. 3 to derive a data segment 26 as shown in FIG. 1F which is more suitable for transmission. Finally, an in-phase pilot component may be added to data segment 26 which has the effect of DC offsetting each symbol by, for example, one unit to generate a data segment 28 as shown in FIG. 1G. Data segment 26 or 28, the majority of the symbols of which are desirably at the minimum positive level of (+1) or (+2) respectively, is subsequently transmitted for reception by an appropriate receiver.

Figure 1H:
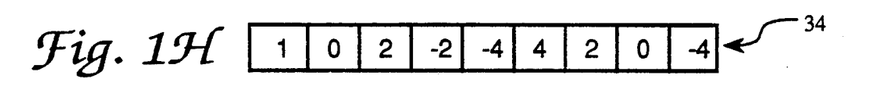
Figure 1I:
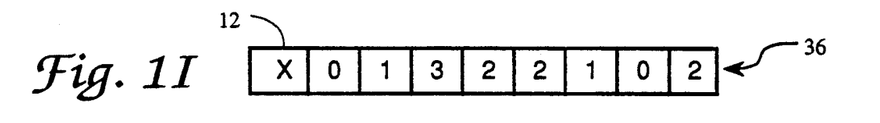
Figure 4:
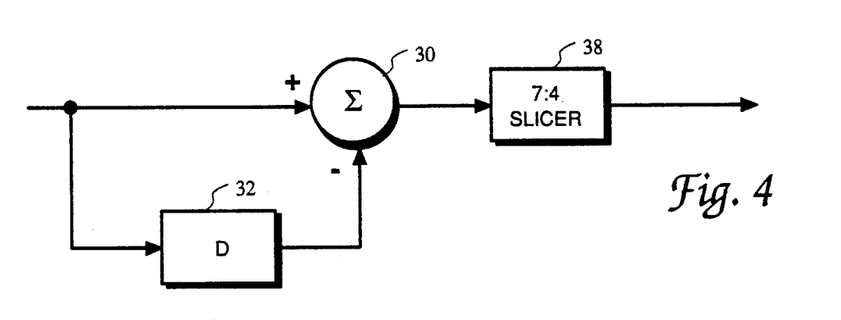
FIG. 4 is a block diagram of a linear feedforward postcoding filter useful in explaining the operation of the receiver of the invention.
Figure 5:
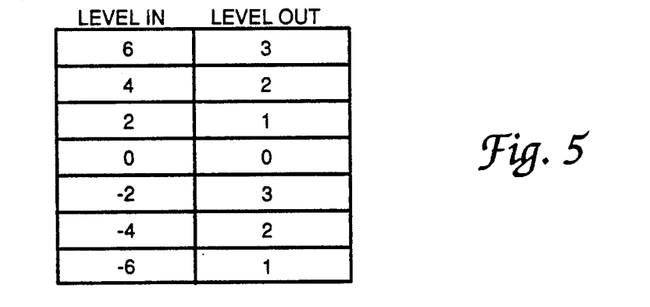
FIG. 5 is a level conversion table used in the receiver of the invention.

In the receiver, received data segment 26 or 28, depending on whether a pilot is or is not used, is processed by a linear postcoding filter as shown in FIG. 4 to cancel NTSC co-channel interference as explained in the referent copending applications. Although it is not necessary, the pilot component may be subtracted from data segment 28 (resulting in a data segment equivalent to data segment 26) before applying the received signal to the postcoding linear filter of FIG. 4. The filter of FIG. 4 comprises a feedforward filter including a linear adder 30 and a feedforward delay path comprising a delay element 32 having a delay corresponding to the temporal spacing of the received data symbols. Adder 30 linearly subtracts the immediately previous symbol of received data segment 26 or 28 from each current symbol to derive a 7-level intermediate data segment 34 as shown in FIG. 1H at its output. The 7-level intermediate data segment 34 developed at the output of adder 30 is subsequently converted to a corresponding 4-level data segment 36 as shown in FIG. 1I by a 7:4 level slicer 38. Slicer 38 may implement a symbol conversion table as shown in FIG. 5. It will be observed that, except for the offset symbol 12 which is discarded in the receiver, data segment 36 derived in the receiver is identical to the original video related data segment 10. Advantageously, through the use of offset symbol 12 as described above, data segment 36 is suitably recoverable in the receiver solely using the postcoding arrangement of FIG. 4, which is necessary in any event to reduce co-channel NTSC interference.

Figure 1J:
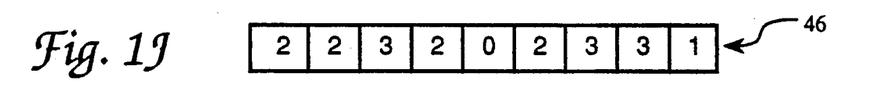
Figure 6:
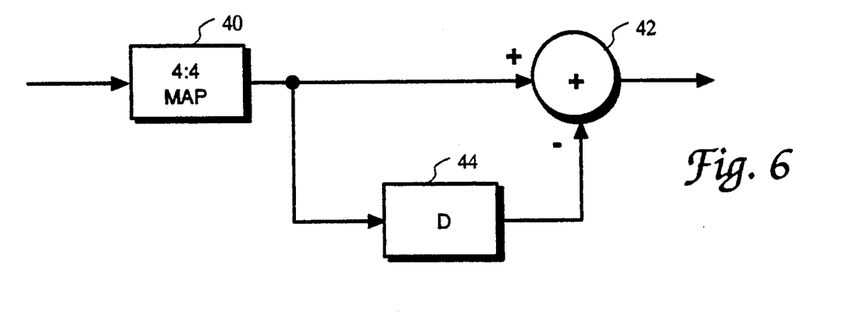
FIG. 6 is a block diagram of a modulo feedforward postcoding filter useful in explaining the operation of the receiver of the invention.

As mentioned previously, in the absence of significant NTSC co-channel interference, received data segment 26 or 28 may be postcoded in the receiver by a complementary modulo filter to provide improved noise performance. Such an arrangement is illustrated in FIG. 6 and will be seen to comprise an input 4:4 mapper 40 whose output supplies the positive input of a modulo adder 42 and a one symbol delay element 44. Mapper 40, which implements the reverse mapping function illustrated in the table of FIG. 3, maps received data segment 26 (or the equivalent comprising data segment 28 with the pilot component removed) into intermediate data segment 46 as shown in FIG. 1J. This data segment is then processed by the filter comprising modulo adder 42 and delay 44 to provide the properly decoded data segment 48 as shown in FIG. 1K, where again the offset symbol 12 is discarded.

Another feature of the present invention resides in the performance of the system in response to transmission errors. In particular, due to the use of feedforward postcoding arrangements in the receiver filters, an error in the transmission of any symbol, including the offset symbol, will result in the creation of only one additional symbol error. That is, the transmission error will not effect the entire data segment but only the symbol received after the symbol in error. This is illustrated by the data segments 50 and 52 shown in FIGS. 1L and 1M respectively. Data segment 50 corresponds to received data segment 28 except that the offset symbol has erroneously been received at a b 3-level instead of the correct 2-level. Postcoded data segment 52 reflects the error in the offset symbol and in the next symbol which is reproduced at level-1 instead of at level-0. However, quite significantly, no other errors are created in the reproduced data segment.

The principles of the invention generally described above may be implemented in various embodiments, some of which are described in detail below. In all of these embodiments, the delay characterizing the delay element used in the precoding and postcoding filters preferably corresponds to twelve (12) data symbols to facilitate reduction of co-channel NTSC interference components in the receiver as disclosed in copending application, Ser. No. 07/611,236 now U.S. Pat. No. 5,087,975. As a consequence, the input 4-level video related digital data may be advantageously provided in the form of twelve interspersed subsegments, each respective subsegment comprising a plurality of symbols spaced from each other by twelve sample intervals. Thus, since the spacing between subsegment symbols corresponds to the filter delay, the processing of each individual subsegment conforms to the numerical example given above.

Figure 7:
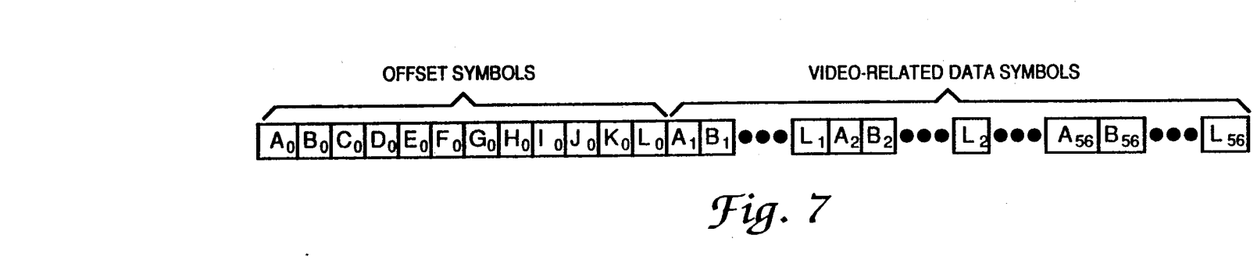
FIG. 7 illustrates the manner in which a horizontal line of video related data is formatted into a plurality of subsegments according to a preferred embodiment of the invention.

In accordance with the foregoing, the input data is preferably formatted for transmission as a plurality of horizontal lines of interspersed subsegments as illustrated in FIG. 7. As shown, each horizontal line or segment may comprise about 684 symbols comprising twelve interspersed subsegments A-L of 4-level video related data symbols. Each subsegment A-L comprises 57 symbols separated from each other by twelve symbol intervals. Thus, for example, subsegment A comprises symbols $A_0-A_{56}$, subsegment B symbols $B_0-B_{56}$, and so on. The first symbol $A_0-L_0$ of each subsegment comprises the offset symbol for the respective subsegment, with the remaining symbols representing video related data, except for the last four symbols of each segment which may represent a horizontal sync character. As mentioned above, formatting the input data in this manner allows each subsegment to be processed in accordance with the principles previously set forth.

Figure 8:
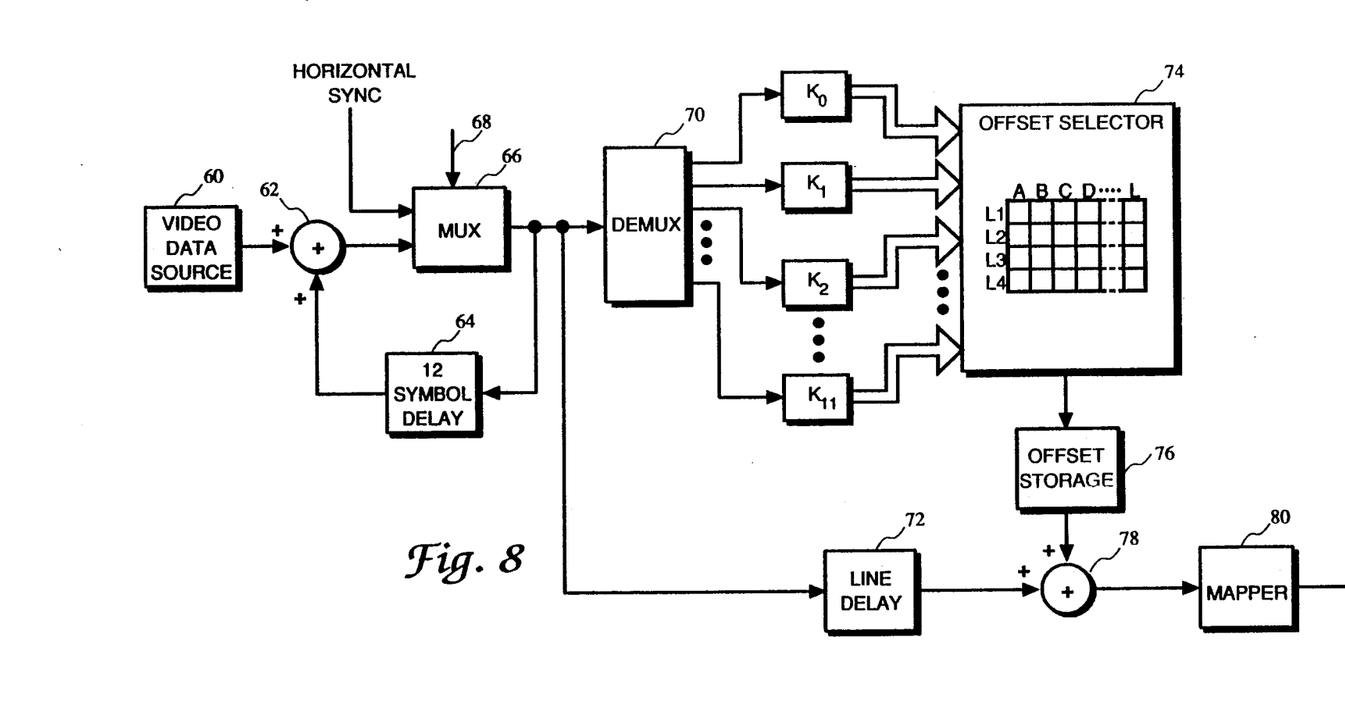
FIGS. 8-10 are block diagrams of three embodiments of the invention.

Referring now to FIG. 8, which illustrates a first embodiment of an encoder constructed according to the invention, a video data source 60 provides a video related data signal formatted in a series of successive horizontal lines as illustrated in FIG. 7. The data signal is initially precoded by a filter comprising a modulo-4 adder 62 and a 12-symbol feedback delay element 64. A multiplexer 66 is inserted between the output of adder 62 and the input of delay element 64 and is operable in response to a select signal on a line 68 for coupling a fixed sequence of four symbols comprising a horizontal sync character to its output during the sync interval of each horizontal line and is otherwise operable for coupling the output of adder 62 to the feedback path of the precoding filter. The output of multiplexer 66 thus comprises twelve precoded subsegments, each corresponding to the precoded data segment 18 of FIG. 1B.

The output of multiplexer 66 is applied to a demultiplexer 70 and to the input of a one horizontal line delay 72. Demultiplexer 70 separates the twelve precoded subsegments A-L and couples each to the input of a respective subsegment counter group $K_0-K_{11}$. Each of the subsegment counter groups $K_0-K_{11}$ preferably comprises four counters for counting the number of symbols in a respective subsegment characterized by each of the four possible levels 3-2-1-0. The four symbol counts thusly accumulated for each subsegment by a respective one of the subsegment counter groups $K_0-K_{11}$ are applied to an offset selector 74 which executes an algorithm for determining the offset symbol for each data subsegment. While various algorithms may be utilized for this purpose, a presently preferred algorithm includes determining for each precoded subsegment the level at which the greatest number of symbols occur and then deriving a modulo-4 offset for translating this level to a selected level, which preferably, although not necessarily, comprises the least positive symbol transmission level. The twelve derived offset values, one for each subsegment, are coupled from offset selector 74 for storage in an offset memory 76. The output of memory 76 is then applied to a modulo-4 adder 78 where the stored offset value for each respective subsegment is added to each symbol thereof, including the offset symbol. The result of this operation corresponds to the development of data segment 20 of FIG. 1C. Finally, the output of adder 78 is applied to a mapper 80 which executes the mapping function of the table of FIG. 3 to provide output subsegments corresponding to data segment 26 of FIG. 1F.

Figure 9:
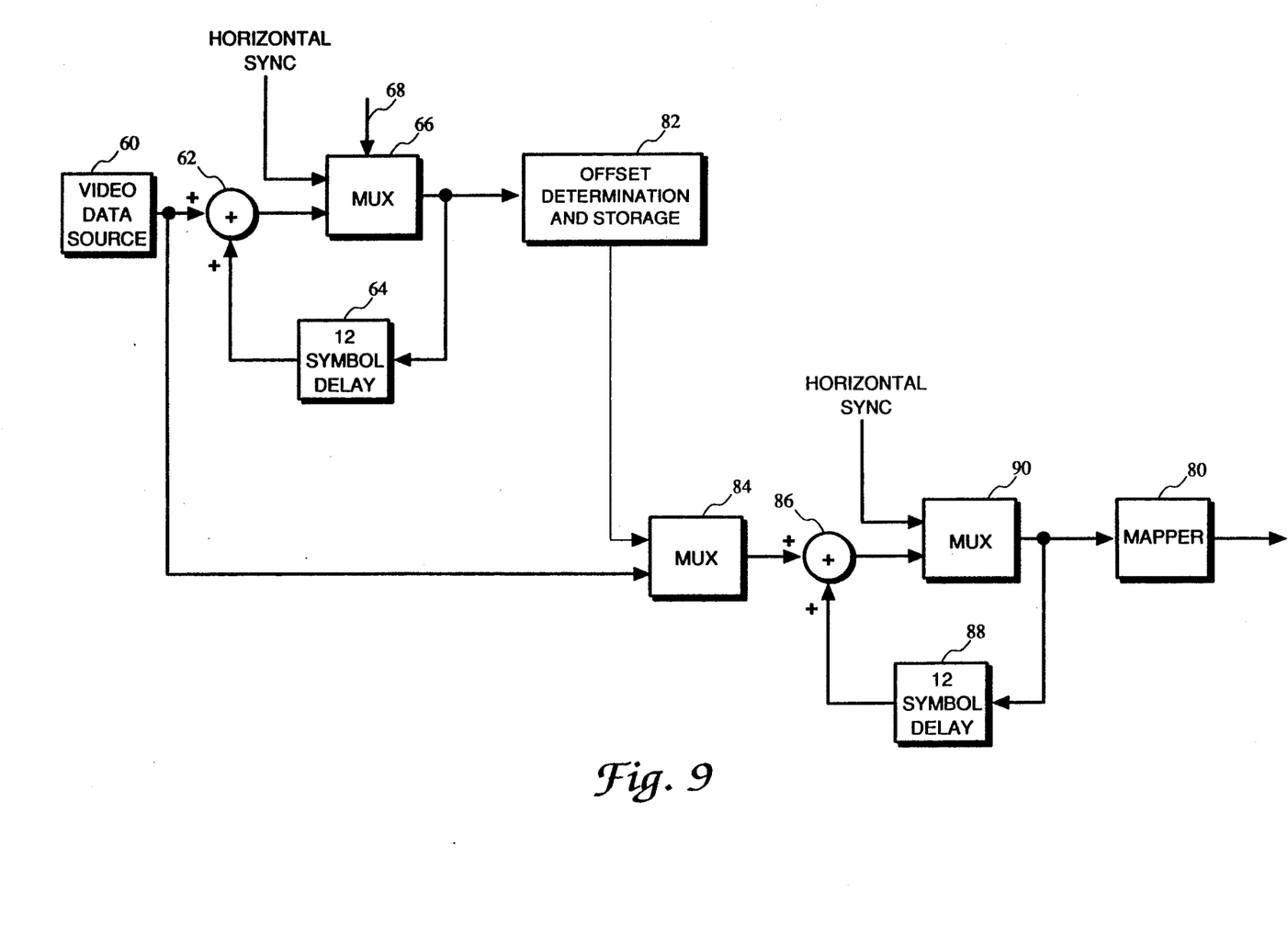

An alternate embodiment which provides an equivalent result is illustrated in FIG. 9. The interspersed data subsegments are again provided by video source 60 and precoded as in the embodiment of FIG. 8. The precoded subsegments are then applied to an offset determination and storage unit 82 corresponding to demultiplexer 70, subsegment counter groups $K_0-K_{11}$, offset selector 74 and offset storage 76 of FIG. 8. The twelve offset values derived by unit 82 for the input precoded subsegments are applied to one input of a multiplexer 84, the other input of which is coupled to the output of data source 60. Multiplexer 84 is operated to initially couple the twelve offset symbol values $A_0-L_0$ from unit 82 to its output followed by the remaining subsegment symbols $A_1-L_{56}$ from source 60. The output of multiplexer 84 therefore corresponds to data segment 22 of FIG. 1D in which each subsegment from source 60 is modified by insertion of the appropriate offset symbol. The modified subsegments are then precoded by a second precoding filter comprising a modulo-4 adder 86 and a twelve symbol delay element 88 to provide a plurality of offset compensated precoded subsegments, each corresponding to data segment 24 of FIG. 1E. A multiplexer 90 is inserted in the feedback path between the output of adder 86 and the input of delay 88 to allow insertion of the four symbol horizontal sync character.

Finally, the output of multiplexer 90, which is equivalent to the output of adder 78 of FIG. 8, is applied to mapper 80 which executes the mapping table of FIG. 3.

Figure 10:
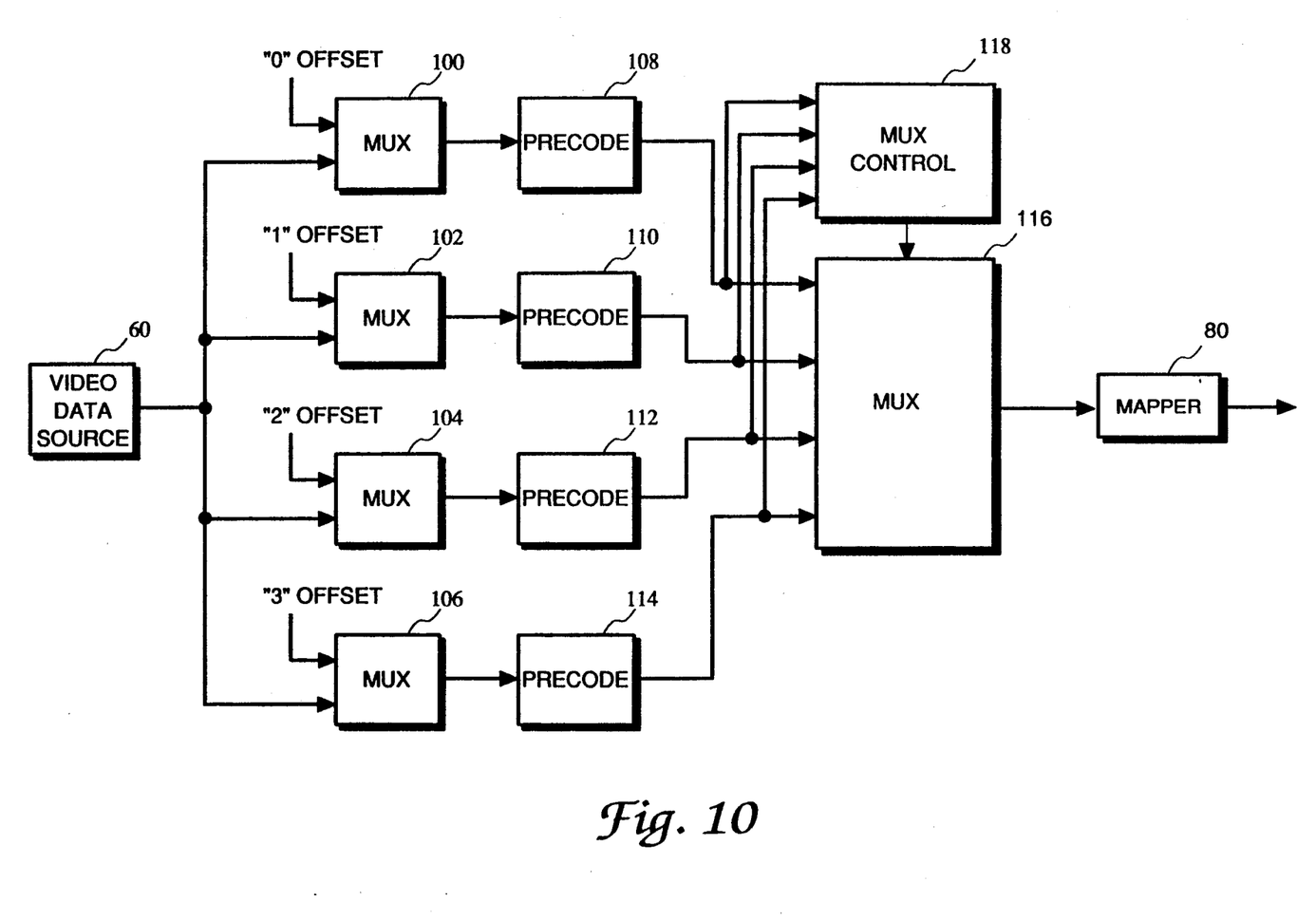

A further embodiment of the invention is illustrated in FIG. 10. In this case, the output of video data source 60 is applied to one input of each of four multiplexers 100, 102, 104 and 106. The second input of multiplexer 100 is supplied with a 0-level offset symbol such that the output of the multiplexer comprises the twelve data subsegments with each of the twelve offset symbols set to the 0-level. Similarly, the second inputs of multiplexers 102, 104 and 106 are supplied with 1-level, 2-level and 3-level offset symbols respectively such that their outputs each reflect the input data subsegments, but each with its twelve offset symbols set to either a 1-level (multiplexer 102), a 2-level (multiplexer 104) or a 3-level (multiplexer 106). The outputs of multiplexers 100–106 are then each precoded by a respective precoding filter 108–114 and coupled thereby to the inputs of an output multiplexer 116 and a multiplexer control unit 118.

Multiplexer control unit 118 analyzes the four precoded versions of each of the twelve subsegments and identifies the precoded version of each subsegment having the greatest number of symbols occurring at the minimum positive transmitted symbol level. Based on this analysis, control unit 118 then operates multiplexer 116 for coupling only the identified versions of the precoded subsegments to its output, which is, therefore, equivalent to the outputs produced by adder 78 and multiplexer 90 of FIGS. 8 and 9 respectively. As in the previous embodiments, the output of multiplexer 116 is mapped by mapper 80 according to the table of FIG. 3. Also, as previously indicated, other algorithms can be utilized by control unit 118 for controlling the operation of multiplexer 116.

Figures 11, 12:
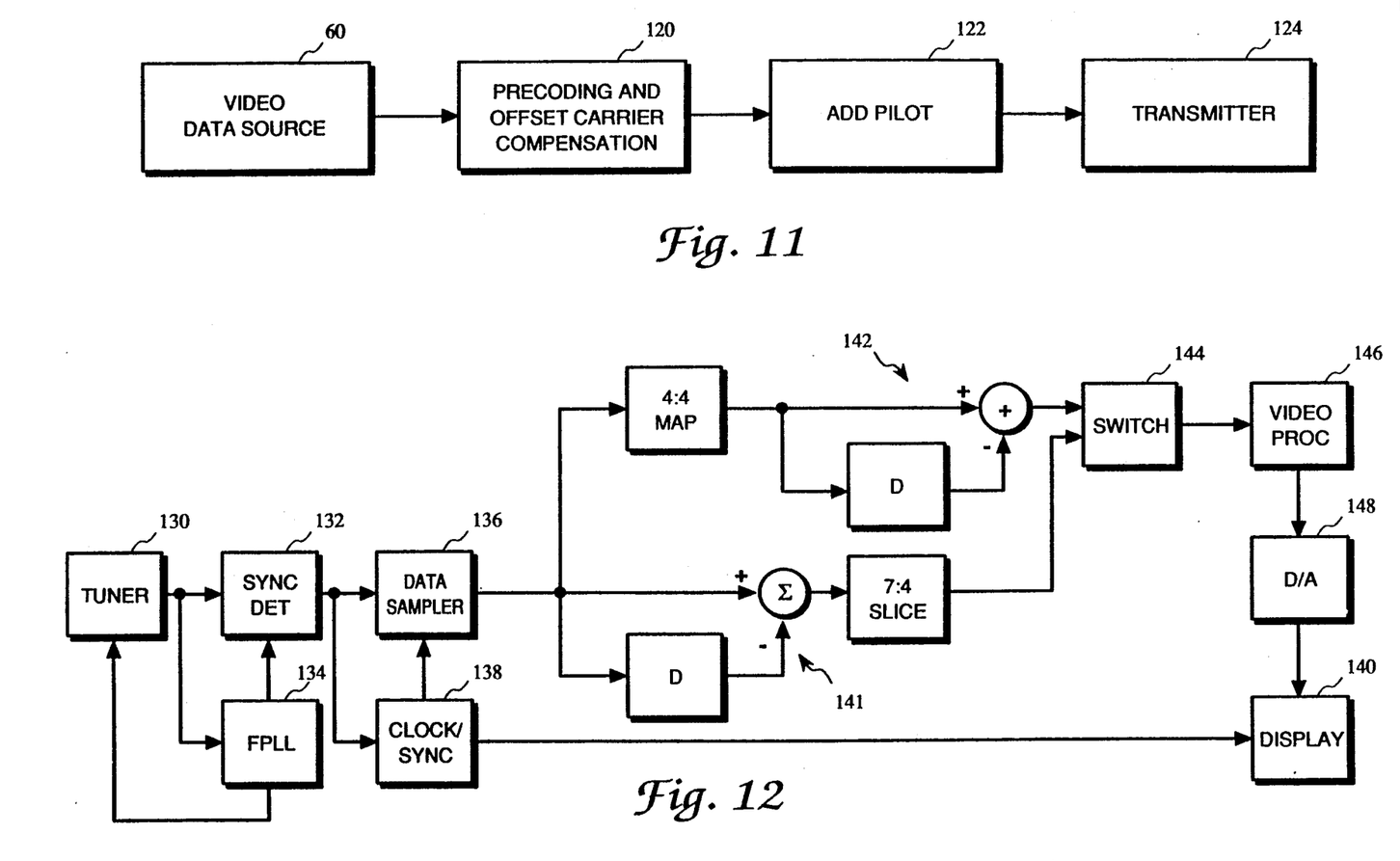
FIG. 11 is a simplified block diagram of a television signal transmitter incorporating the embodiments of FIGS. 8-10.
FIG. 12 is a block diagram of a television signal receiver constructed according to the invention.

Referring now to FIG. 11, a block 120 represents any of the precoding and carrier offset compensation embodiments of FIGS. 8–10. As discussed previously, the output of this block corresponds, for each of the twelve interspersed data subsegments A–L, to data segment 26 of FIG. 1F. Advantageously, each subsegment is preferably encoded such that the largest number of symbols thereof occur at the least positive symbol level, i.e. level +1. This insures that the majority of the output signal will be above the zero carrier level thereby greatly facilitating receiver lock-up of the transmitted signal. Receiver lock-up can be further enhanced by adding an in-phase pilot to the output of block 120 as illustrated at 122. Addition of the pilot effectively introduces a DC offset of one unit to the output of block 120 as represented by data segment 28 of FIG. 1G. Finally, the output of block 122 is applied to a transmitter 124 for transmission of the encoded data segments over a standard 6 MHz television channel.

With reference now to FIG. 12, the transmitted signal is received by a receiver including a tuner 130. Tuner 130 converts the received signal to an intermediate frequency (IF) signal which is applied to a synchronous detector 132 and to a frequency and phase locked loop (FPLL) 134. FPLL 134 locks to the applied IF signal and generates a continuous wave output for application to synchronous detector 132. FPLL 134 also generates an automatic frequency control voltage for controlling the operation of tuner 130. Synchronous detector 132, in response to the output of FPLL 134, demodulates the received signal and applies the demodulated signal to the inputs of a data sampler 136 and a clock and sync recovery circuit 138. Circuit 138 applies a clock signal to a second input of data sampler 136 and appropriate sync signals for controlling a display 140.

Figure 1K:
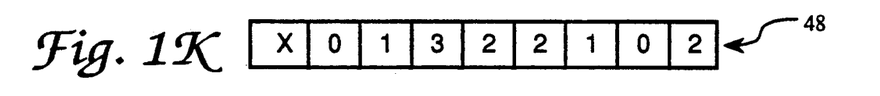
Figure 1L:
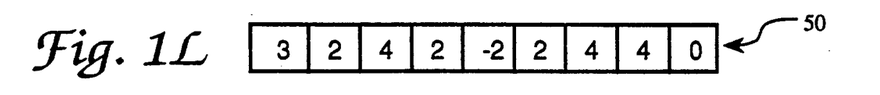
Figure 1M:
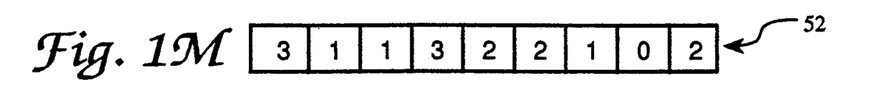
Figure 2:
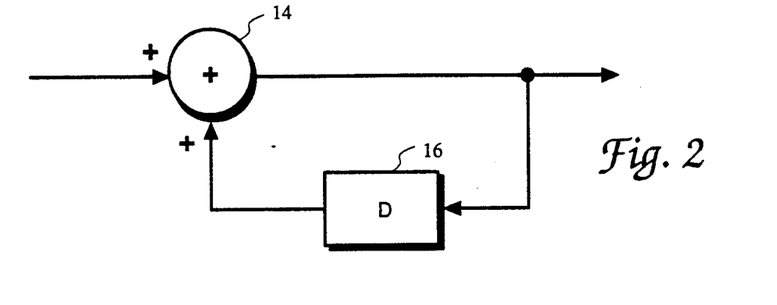
FIG. 2 is a block diagram of a modulo feedback precoding filter useful in explaining the operation of the encoder of the invention.

The output of data sampler 136 comprises the encoded data subsegments corresponding in form to either data segment 26 of FIG. 1F (in the case where no pilot is used during transmission) or data segment 28 of FIG. 1G (in the case where a pilot is used during transmission). In either event, the encoded data subsegments are applied to a linear postcoding filter 141 and a modulo-4 postcoding filter 142, both postcoding filters 141 and 142 having configurations complementary to the precoding filter used in the transmitter. Linear filter 141 corresponds to the filter shown in FIG. 4 except that the feedforward delay element is characterized by a twelve symbol delay while modulo-4 filter 142 corresponds to the filter shown in FIG. 6 with its delay element also being characterized by a twelve symbol delay. The outputs of both filters 141 and 142 are applied to a switch 144 which is operated for coupling one of the filter outputs to a video processor 146. It will be recalled that linear filter 141 is operable for reducing interfering NTSC co-channel components so that its output corresponding to data segment 36 of FIG. 1I, is selected by switch 144 in the presence of such interference. In the absence of NTSC interference, the output of filter 142, corresponding to data segment 48 of FIG. 1K, is selected by switch 144 to provide improved signal to noise performance. In this regard, it will be observed that decoding of the precoded and carrier offset compensated data subsegments is fully performed by postcoding filters 141 and 142 without the need for providing any additional decoding circuitry. Finally, the decoded subsegments A–L are suitably processed by video processor 146, which discards offset symbols $A_0$–$L_0$, and applies the processed video signal through a D/A converter 148 to display 140.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing descriptions and accompanying drawings is offered by way of illustration only and not as a limitation. The actual scope of the invention is intended to be defined in the following claims when viewed in their proper perspective based on the prior art.

What is claimed is:

1. A method of transmitting a video data signal comprising:

providing said data signal in the form of an input sequence of N-level data symbols;

modulo-N offsetting each symbol of said input sequence of N-level data symbols to derive an output sequence of modulo-N offset N-level symbols, the majority of which are characterized by a predetermined level; and transmitting said output sequence of modulo-N offset N-level symbols.

2. The method of claim 1 wherein said modulo-N offsetting step comprises deriving said output sequence of modulo-N offset N-level symbols such that the level characterizing the largest number of symbols thereof comprises a predetermined positive level.

3. The method of claim 2 wherein the levels of said modulo-N offset N-levels symbols include a minimum positive level and wherein said predetermined positive level comprises said minimum positive level.

4. The method of claim 1 wherein said input sequence comprises a sequence of temporally spaced N-level data symbols and including precoding said input sequence of N-level data symbols using a modulo-N filter having a feedback path including a delay related to said symbol spacing to derive an output sequence of modulo-N offset and precoded N-level symbols.

5. The method of claim 4 wherein said output sequence includes an initial non-video related offset symbol, and wherein said precoding and offsetting steps comprise deriving said output sequence of N-level symbols such that each symbol thereof is offset by an amount corresponding to the level of said offset symbol.

6. The method of claim 1 wherein said input sequence includes an initial non-video related offset symbol and including precoding said input sequence using a modulo-N feedback filter for deriving a precoded sequence of N-level symbols and sorting said precoded sequence to identify the most often occurring level characterizing the symbols thereof.

7. The method of claim 6 including determining an offset factor in response to said sorting step, said offset factor representing the difference between said identified level and said predetermined level.

8. The method of claim 7 including modulo-N combining said offset factor with each of the symbols of said precoded sequence to derive said output sequence.

9. The method of claim 7 including setting said offset symbol of said input sequence to a level corresponding to said offset factor and then precoding said input sequence of symbols using a further modulo-N feedback filter for deriving said output sequence.

10. The method of claim 1 wherein said input sequence includes an initial non-video related offset symbol and including providing N of said input sequences each having a different level offset symbol, precoding each of said N input sequences using a modulo-N filter having a feedback path including a delay related to the spacing of said symbols and selecting one of said N precoded input sequences for deriving said output sequence.

11. The method of claim 1 including adding a pilot to said output sequence by offsetting each symbol thereof by a selected amount.

12. The method of claim 1 including receiving and processing said transmitted output sequence for reconstructing said input sequence.

13. The method of claim 5 including receiving and processing said transmitted output sequence for reconstructing said input sequence, said reconstructing step comprising discarding the offset symbol included as part of said output sequence.

14. The method of claim 12 wherein said receiver processing step comprises postcoding said received output signal such that an error in a received symbol is not reflected in a substantial part of said reconstructed input sequence.

15. The method of claim 5 including receiving and processing said transmitted output sequence for reconstructing said input sequence, said receiver processing step comprising postcoding said received output sequence using filter means complementary to said precoding filter.

16. The method of claim 15 wherein said receiver processing step comprises postcoding said received output sequence using a linear filter having a feed forward path including a delay related to the spacing of said symbols to derive a sequence of M-level data symbols, where M is greater than N, and converting said sequence of M-level data symbols for reconstructing said input sequence.

17. The method of claim 15 wherein said receiver processing step comprises postcoding said received output sequence using a modulo-N filter having a feed forward path including a delay related to the spacing of said symbols for reconstructing said input sequence.

18. A television signal transmission system comprising:
  means for providing an input video data signal including a plurality of input data subsegments each comprising an input sequence of interspersed N-level data symbols spaced from each other by a predetermined time interval;
  processing means including a modulo-N precoding filter including a feedback path characterized by a delay equal to said predetermined time interval for modulo-N precoding and modulo-N offsetting each of said input subsegments for providing a respective output subsegment, each output subsegment comprising a sequence of N-level symbols the majority of which comprise a predetermined level;
  means for transmitting said output subsegments;
  means for receiving said transmitted output subsegments; and
  means including a complementary postcoding filter for reconstructing said input data signal in response to said received signal, said postcoding filter comprising a filter circuit including a feed forward path characterized by a delay equal to said predetermined time interval.

19. The system of claim 18 wherein said reconstructing means comprises means for postcoding said received output subsegments such that an error in a received symbol is not reflected in a substantial part of said reconstructed input data signal.

20. The system of claim 18 including means for adding a D.C. offset to the symbols of each of said output subsegments representing an in-phase pilot component.

21. The system of claim 18 wherein said postcoding filter comprises a filter for linearly subtracting a previously received symbol of each respective subsegment from a currently received symbol of the corresponding subsegment.

22. The system of claim 18 wherein said postcoding filter comprises a filter for modulo-N subtracting a previously received symbol of each respective subsegment from a currently received symbol of the corresponding subsegment.

23. The system of claim 18 wherein said predetermined level corresponds to the minimum positive level of the symbols of said transmitted output subsegments.

24. The system of claim 18 wherein said predetermined time interval comprises twelve symbol sample intervals.

25. The system of claim 18 wherein each of said input subsegments includes an initial non-video related offset symbol, said precoding filter being responsive to each of said input subsegments for generating a respective precoded sequence of N-level symbols, and wherein said processing means further comprises means for sorting each of said precoded sequences to identify the most often occurring level characterizing the symbols thereof and means responsive to said sorting means for determining an offset factor for each of said precoded sequences representing the difference between said identified level and said predetermined level.

26. The system of claim 25 including means for modulo-N combining each of the symbols of each of said precoded sequences with the respective offset factor determined therefor.

27. The system of claim 18 wherein each of said input subsegments includes an initial non-video related offset symbol and including a second precoding filter responsive to each of said input subsegments for generating a respective precoded sequence of N-level symbols, said processing means comprising means for sorting each of said precoded sequences to identify the most often occurring level characterizing the symbols thereof and means responsive to said sorting means for determining an offset factor for each of said precoded sequences representing the difference between said identified level and said predetermined level.

28. The system of claim 27 including means for setting the offset symbol of each of said input subsegments to a level corresponding to the respective offset factor determined therefor and for coupling each of said input subsegments to said modulo-N precoding filter for modulo-N precoding and offsetting the symbols of each of said input subsegments for providing said output subsegments.

29. The system of claim 18 wherein each of said input subsegments includes an initial non-video related offset symbol and including means for providing N of each of said input subsegments each having a different level offset symbol, means for precoding each of said N input subsegments and means for selecting one of each of said N precoded subsegments for providing a respective output subsegment.

30. A television signal transmission system comprising:
means for providing an input video data signal in the form of an input data segment comprising a sequence of N-level data symbols spaced from each other by a predetermined time interval;
processing means including a modulo-N precoding filter including a feedback path characterized by a delay equal to said predetermined time interval for modulo-N precoding and modulo-N offsetting the symbols of said input segment for providing an output segment, said output segment comprising a sequence of N-level symbols the majority of which comprise a predetermined level;
means for transmitting said output segment;
means for receiving said transmitted output segment; and
means including a complementary postcoding filter for reconstructing said input video data signal in response to said received signal, said postcoding filter comprising a filter circuit including a feed forward path characterized by a delay equal to said predetermined time interval.

31. The system of claim 30 wherein said reconstructing means comprises means for postcoding said received output subsegments such that an error in a received symbol is not reflected in a substantial part of said reconstructed input data signal.

32. The system of claim 29 including means for adding a D.C. offset to the symbols of said output segment representing an in-phase pilot component.

33. The system of claim 30 wherein said postcoding filter comprises a filter for linearly subtracting a previously received symbol of said received output segment from a currently received symbol of the segment.

34. The system of claim 30 wherein said postcoding filter comprises a filter for modulo-N subtracting a previously received symbol of said received output segment from a currently received symbol of the segment.

35. The system of claim 30 wherein said predetermined level corresponds to the minimum positive level of the symbols of said transmitted output segment.

36. The system of claim 30 wherein said input segment includes an initial non-video related offset symbol, said precoding filter being responsive to said input segment for generating a precoded sequence of N-level symbols, and wherein said processing means further comprises means for sorting said precoded sequence to identify the most often occurring level characterizing the symbols thereof and means responsive to said sorting means for determining an offset factor for said precoded sequence representing the difference between said identified level and said predetermined level.

37. The system of claim 36 including means for modulo-N combining the symbols of said precoded sequence with said offset factor.

38. The system of claim 30 wherein said input segment includes an initial non-video related offset symbol and including a second precoding filter responsive to said input segment for generating a precoded sequence of N-level symbols, said processing means further comprising means for sorting said precoded sequence to identify the most often occurring level characterizing the symbols thereof and means responsive to said sorting means for determining an offset factor for said precoded sequence representing the difference between said identified level and said predetermined level.

39. The system of claim 38 including means for setting the offset symbol of said input segment to a level corresponding to said offset factor and means for coupling said input segment to said modulo-N precoding filter for generating said output segment.

40. The system of claim 30 wherein said input segment includes an initial non-video related offset symbol and including means for providing N of said input segments each having a different level offset symbol, means for precoding each of said N input segments and means for selecting one of said N precoded segments for providing said output segment.

41. A television signal receiver comprising:
means for receiving a sequence of N-level modulo-N precoded and modulo-N offset symbols spaced from each other by a predetermined time interval and representing a received video data signal, said sequence including an initial non-video related offset symbol defining the amount of offset characterizing said symbols; and
processing means including a postcoding filter responsive to said sequence of N-level symbols for reconstructing said received video data signal, said postcoding filter comprising a filter circuit including a feedforward path characterized by a delay equal to said predetermined time interval.

42. The receiver of claim 41 wherein said postcoding filter comprises means for linearly combining a previously received symbol of said sequence with a currently received symbol thereof.

43. The receiver of claim 41 wherein said postcoding filter comprises means for modulo-N combining a previously received symbol of said sequence with a currently received symbol thereof.

44. The receiver of claim 41 wherein said predetermined time interval comprises twelve symbol sample intervals.

45. A television signal receiver comprising:

means for receiving a television signal comprising a plurality of successive data frames, each of said data frames comprising a plurality of data segments with each data segment including a first group of received adjacent symbols representing a predetermined synchronization character, a second group of received adjacent N-level modulo-N precoded and offset symbols representing a transmitted video-related data signal and a third group of received adjacent N-level symbols representing the amount of offset characterizing the symbols of said second group of received symbols, each of said third groups of received symbols being disposed between one of said first groups and one of said second groups of received symbols;

means coupled to said receiving means for developing a synchronization signal in response to said first group of received symbols; and decoding means coupled to said receiving means and responsive to said first, second and third groups of received symbols for generating respective first, second and third groups of decoded symbols, said second groups of decoded symbols representing said video-related data signal.

46. The television receiver of claim 45 including display means responsive to said synchronization signal and said second groups of decoded symbols for displaying a video image.

47. The television receiver of claim 46 wherein said display means comprises means for discarding said third groups of decoded symbols in displaying said video image.

48. The television receiver of claim 45 wherein said decoding means comprises means for combining each symbol of said first, second and third groups of received symbols with a selected previously received one of said symbols for generating said respective first, second, and third groups of decoded symbols.

49. A method of transmitting a television signal comprising:

generating a television signal comprising a plurality of successive data segments, each of said data segments comprising a first group of adjacent symbols representing a predetermined synchronization character, a second group of adjacent N-level modulo-N precoded and offset symbols representing a video-related data signal and a third group of adjacent N-level symbols representing the amount of offset characterizing the symbols of said second group of symbols, each of said third groups of symbols being disposed between one of said first groups and one of said second groups of symbols;

transmitting said television signal; and receiving said transmitted television signal.

50. The method of claim 49 including:

recovering a synchronization signal in response to the first group of symbols of said received television signal;

decoding said first, second and third groups of received symbols for generating respective first, second and third groups of decoded symbols, said second groups of decoded symbols representing said video-related data signal; and displaying a video image in response to said synchronization signal an said second groups of decoded symbols.

51. The method of claim 50 including discarding said third groups of decoded symbols.

52. The method of claim 50 including combining each symbol of said first, second and third groups of received symbols with a selected previously received one of said symbols for generating said respective first, second and third groups of decoded symbols.

53. The method of claim 49 wherein the symbols of said first, second and third groups of symbols are transmitted and received at the relative levels of (+4), (+2), (0) and (−2).

* * * * *